3,383,356
HALOCARBON CATALYST INHIBITORS FOR REACTIVE ORGANOSILICON COMPOSITIONS
John M. Nielsen, Burnt Hills, N.Y., assignor to General Electric Company, a corporation of New York
No Drawing. Filed Mar. 30, 1967, Ser. No. 626,934
8 Claims. (Cl. 260—46.5)

ABSTRACT OF THE DISCLOSURE

The activity of platinum compounds used as catalysts in the addition of ≡SiH containing organosilicon compounds to alkenyl groups is greatly decreased by the addition of a number of halocarbon inhibitors. The inhibitors have two carbon atoms and at least three halogen atoms per molecule. Perchloroethylene is a particularly good inhibitor. The halocarbon inhibited reaction system is activated by evaporation of the catalyst inhibiting halocarbon. The halocarbon evaporation and cure may be at room temperature or at an elevated temperature.

---

The invention is concerned with the production of stable mixtures of copolymerizable organosilicon compositions containing a platinum compound catalyst. More particularly, the invention relates to a process for reducing activity of a platinum compound catalyst in the presence of a mixture of reactants comprising (a) an alkenyl polysiloxane containing at least two alkenyl groups per molecule and having the average formula:

(1)   

and (b) a hydrogen polysiloxane containing at least two ≡SiH groups per molecule and having the average formula:

(2)   

where R is an organic radical attached to silicon by a C-Si linkage and is selected from the class consisting of monovalent hydrocarbon radicals free of aliphatic unsaturation, halogenated monovalent hydrocarbon radicals free of aliphatic unsaturation, and cyanoalkyl radicals, R' is an organic radical attached to silicon by a C-Si linkage and contains aliphatic carbons linked by multiple bonds (e.g., vinyl, allyl, methallyl, butenyl, ethynl, etc.), $a$ has a value of from 0 to 2.0, inclusive, $b$ has a value of from 0.0005 to 2.0, inclusive, and the sum of $a$ plus $b$ is equal to from 1.0 to 3, inclusive, which process comprises incorporating in the platinum-containing mixture of ingredients a halocarbon catalyst inhibitor selected from the class comprising halocarbons having two carbon atoms and at least three halogen substituents having an atomic weight of less than 126 positioned anywhere on the molecule. Examples of such compounds include, bromodichloroethane, trichloroethane, fluorotrichloroethane, dibromodichloroethane, tetrachloroethane, pentachloroethane, hexachloroethane, fluorobromotetrachloroethane, chlorodifluoroethane, trifluoroethane, bromotrifluoroethane, tetrafluoroethane, chlorotetrafluoroethane, dibromotrifluoroethane, pentafluoroethane, bromotetrafluoroethane, trichlorotrifluoroethane, hexafluoroethane, tribromoethane, chlorodibromoethane, dichlorotribromoethane, tetrabromoethane, chlorofluorotribromoethane, pentabromomethane, chloropentabromoethane, fluorochlorotribromoethane, hexabromoethane, trichloroethylene, tetrachloroethylene, dibromochloroethylene, difluorochloroethylene, tribromochloroethylene, trifluorochloroethylene, dibromofluorochloroethylene, fluorodichloroethylene, bromodichloroethylene, difluorodichloroethylene, dibromodichloroethylene, bromotrichloroethylene, fluorotrichloroethylene, chlorodifluoroethylene, bromodifluoroethylene, dibromodifluoroethylene, chlorodibromoethylene and fluorodibromoethylene. The halocarbon catalyst inhibitor is present in a concentration of from 6 to 85% by weight of the total reaction mixture. Perchloroethylene is the preferred inhibitor.

In order to provide cross linking of the molecules in the subsequent polymerization it is required that either the alkenyl polysiloxane or the hydrogen polysiloxane or both have an average of more than two reactive sites per molecule.

In order to obtain adequate chain lengths by the subsequent polymerization it is required that the alkenyl polysiloxane have an average of at least two reactive alkenyl groups per molecule and the hydrogen polysiloxane have an average of at least two reactive hydrogen groups per molecule.

It is known in the art that platinum or a number of platinum-containing compounds will catalyze the addition of silicon-bonded hydrogen across the double bonds of carbons separated by aliphatic unsaturation (this core-action will also be referred to hereinafter as "copolymerization"). Thus, U.S. Patent 2,970,150—Bailey, shows the use of a platnum-on-charcoal catalyst for the addition of organopolysiloxanes containing silanic hydrogen (Si-H) to compounds containing aliphatic unsaturation. U.S. Patent 2,823,218—Speier et al., shows the use of chloroplatinic acid for the same types of reaction. U.S. Patents 3,159,601 and 3,159,662 of Ashby show the use of an olefin complex or a cyclopropane complex of platinum chloride as a catalyst for the addition of organopolysiloxanes containing silanic hydrogen to compounds containing aliphatic unsaturation. U.S. Patent 3,220,972—Lamoreaux, discloses and claims other types of platinum compound containing catalysts for the same types of reaction.

All of the platinum compound catalysts mentioned are especially adaptable to reacting low molecular weight organopolysiloxanes containing silanic hydrogen with low molecular weight organopolysiloxanes containing aliphatic unsaturation to form high molecular weight copolymers by the addition of the silanic hydrogen to the aliphatic unsaturation. It is often desirable to incorporate the platinum compound catalyst designed to effect this addition reaction, in the mixture of organopolysiloxanes and carry out this addition reaction at some future time by the application of heat. Unfortunately, such mixtures of the aforesaid organopolysiloxanes and the platinum compound catalyst do not have the shelf life or the ability to remain stable or unchanged at ambient or room temperatures (about 20-30° C.) for sufficient periods of times required for many commercial applications. Thus, it has been found that in many instances, on standing, the platinum compound catalyst causes the mixture of ingredients to increase undesirably in viscosity and therefore in molecular weight; often this increase in viscosity and molecular weight is so rapid that before commercial use can be made of the mixture, it has gelled to a state which has no utility.

It is also known in the art that a number of compounds can be added to a reactive mixture of an alkenyl polysiloxane, a hydrogen polysiloxane and a platinum compound catalyst to cause reduced activity of the catalyst. U.S. Patent 3,188,299—Chalk, describes nitrogen-containing compounds which are added to the platinum catalyst to reduce or temporarily inhibit its catalytic activity in the presence of the alkenyl polysiloxane and the hydrogen polysiloxane. U.S. Patent 3,188,300—Chalk, shows adding organic phosphines and organic phosphites to the platinum catalyst to reduce or temporarily inhibit its catalytic activity in the presence of alkenyl polysiloxane and the hydrogen polysiloxane. While satisfactory inhibition of the reaction mixture is obtained by the process described in the Chalk patents, the inhibitors leave residues in the product which are undesirable for some applications. The inhibitors disclosed in the Chalk patents also require heat for deactivation which is not undesirable in most applications, but has drawbacks where other heat-sensitive materials are used in conjunction with the curable polysiloxane composition.

I have now discovered that a select group of halocarbons unexpectedly causes reduced activity of platinum catalysts used to effect addition of the silanic hydrogen of the hydrogen organopolysiloxane to the aliphatic unsaturation of the alkenyl polysiloxane. This stability or reduced activity is particularly noticeable at temperatures of from about 20–30° C. When it is desired to reactivate the platinum compound catalyst to overcome the inhibiting effect of the halocarbon inhibitor so as to effect addition of the silanic hydrogen to the aliphatic unsaturation, it is only necessary to evaporate the halocarbon inhibitor. The prior art requires elevated temperatures to deactivate the inhibitor. My inhibitor can be removed at room temperature and a cure effected at room temperature. This is important when temperature-sensitive textiles are impregnated, or plastics or films are coated and a subsequent heat treatment would damage the base. If a heat sensitive base is not involved, the inhibitor is preferably removed at an elevated temperature.

In the description which follows, the following definitions will be used:

"Alkenyl polysiloxane" is intended to cover organopolysiloxanes containing aliphatic unsaturation by means of a double or triple bond between two adjacent carbon atoms which are defined by Formula (1).

"Hydrogen polysiloxane" is intended to cover organopolysiloxanes containing silanic hydrogen which are defined by Formula (2).

"Platinum compound catalyst" is intended to include any platinum-containing composition (other than metallic platinum) suitable for effecting the addition of silanic hydrogen to the above-mentioned aliphatic unsaturation.

"Halocarbon inhibitor" is intended to mean the halogen-containing carbon compounds described earlier which are added to the platinum catalyst to reduce or temporarily inhibit its catalytic activity in the presence of the alkenyl polysiloxane and the hydrogen polysiloxane.

The platinum compound catalyst employed in the practice of the present invention is one which is soluble in either of the organopolysiloxanes and preferably is soluble in both the hydrogen polysiloxane and the alkenyl polysiloxane. Among such catalysts may be mentioned, platinum chloride, platinum sulfate, salts of chloroplatinous acids, such as Na$_2$PtCl$_4$, chloroplatinic acid, etc.

Another type of soluble platinum compound catalyst which can be employed in the practice of the present invention with the aforementioned halocarbon inhibitors are those described in the above-mentioned U.S. Patent 3,220,972—Lamoreaux. These platinum compound catalysts are prepared by (A) forming a reaction mixture of (1) chloroplatinic acid with (2) at least about 2 moles per gram atom of platinum of either an alcohol (e.g., butanol, octyl alcohol, isoamyl alcohol, myricyl alcohol, etc.) or an aldehyde (e.g., amyl aldehyde, octyl aldehyde, tetradecanal, etc.) or an ether (e.g., dibutyl ether, diamyl ether, dimyristyl ether, etc.) and (B) heating said reaction mixture at a temperature of from about 60 to 80° C. at a reduced pressure until the reaction mixture has a ratio of from about 2.0 to about 3.5 atoms of chlorine per atom of platinum.

A detailed description of the method of preparing the platinum compound catalysts within the scope of the Lamoreaux patent is as follows: One mole of chloroplatinic acid hexahydrate and 7 moles of octyl alcohol are mixed together until a homogeneous solution was formed. The reaction mixture is then heated to a temperature of 70° C. and maintained at this temperature under a pressure of 25 millimeters for about 40 hours while continuously removing HCl and water which are formed during the reaction. During the reaction, the chlorine to platinum ratio gradually falls from 6 atoms of chlorine per atom of platinum to 2 atoms of chlorine per atom of platinum. At the end of 40 hours, the reaction mixture is cooled to room temperature and the product is extracted with hexane, filtered, and hexane removed from the filtrate under vacuum. At this point, the catalyst appears to be a complex of PtCl$_2$ and an ether and aldehyde derived from octyl alcohol; specifically, the complex by analysis showed that it contains 1 mole of octyl aldehyde to 2 moles of octyl ether and 1 mole of platinum to 2 moles of chlorine.

Another class of platinum compound catalysts which can be employed in the practice of the present invention are platinum-olefin complexes characterized by the complexes found in the aforementioned Patent No. 3,159,601 —Ashby of the formulae:

(3)      [PtCl$_2$-olefin]$_2$ (4)      H[PtCl$_2$-olefin]

While the olefin portion of the complexes of Formulae (3) and (4) can be almost any type of olefin, it is preferred that the olefin portion of the complex be a hydrocarbon alkene having from 2 to 10 carbon atoms, a cycloalkene having from 5 to 7 carbon atoms, or styrene. Specific examples of olefins useful in making these platinum-olefin complexes are, e.g.: ethylene, propylene, the various isomers of butylene, octylene, cyclopentene, cyclohexene, cycloheptene, etc.

The catalysts within the scope of Formulas (3) and (4) are well known in the art, and their preparation and properties are described, for example, in "Coordination Compounds of Olefins with Metallic Salts," R. N. Keller, Chemical Reviews, 1940–41, 27–28, pages 229–267; and Joy and Orchin, Journal of the American Chemical Society, 81, pages 305–311 (1959).

A still further class of platinum compound catalysts useful in the practice of the present invention are those disclosed and claimed in Patent 3,159,662—Ashby, comprising a platinum-cyclopropane complex having the formula (5)      (PtCl$_2$·C$_3$H$_6$)$_2$ The platinum-cyclopropane complex of Formula (5) is a light yellow powder and is known in the art. For example, this complex of Formula (5) is shown by C. F. H. Tipper, J. Chem. Soc. 2045–6 (1955). The platinum-cyclopropane complex can be prepared by several methods. One of the methods is that shown by Tipper, which involves the reaction between cyclopropane and chloroplatinic acid. Another method of forming the complex of Formula (5) is by effecting reaction between a platinum-ethylene complex having the formula (PtCl$_2$·C$_2$H$_4$)$_2$ and cyclopropane. The platinum-ethylene complex is also well known in the art and is described in the aforesaid articles by Keller and by Joy and Orchin (supra).

A still further class of platinum catalysts which can be employed with the halocarbon inhibititors herein described are those platinum complexes which are in the form of platinum carboxylates. These platinum carboxylates can be obtained by reacting a platinum halide (e.g., platinum chloride) and a water soluble salt of an organic acid in the molar ratio of from 3 to 6 or more moles of the salt of the organic acid per mole of the platinum halide, advantageously employing water or an aliphatic alcohol as the medium in which the reaction is carried out. Any platinum halide can be employed as, for instance, platinic chloride, platinic bromide, platinous bromide, platinic chloride octahydrate (PtCl$_4$·8H$_2$O), chloroplatinic acid (H$_2$PtCl$_6$·6H$_2$O), etc.

Among such salts may be mentioned the alkali-metal salts of monocarboxylic acids (both saturated and aromatic acids), for instance, the alkali-metal salts of butyric, hexanoic, octanoic, benzoic, etc., acids. The inorganic portion of the water-soluble salt may be, for instance, sodium, potassium, cesium, ammonium, etc. The proportions of ingredients used to make the platinum carboxylate can be varied widely and this method yields a soluble platinum salt (or carboxylate) with a minimum of processing. The platinum salt precipitates from the aqueous solution if a suitable alkali-metal salt of a carboxylic acid is used. When an alcohol is used (e.g., ethanol) as the medium, the desired platinum salt remains in solution but the ionic salt, e.g., the sodium chloride, precipitates. Although the structure of this salt is not known precisely, nevertheless, it is believed that when water is used as the medium these platinum carboxylates can be assigned the empirical formula

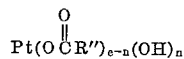

where R'' is a monovalent hydrocarbon radical or halogen-substituted hydrocarbon radical which R in Formula (1) represents, and $n$ is a value from 0 to 1, inclusive, and $e$ is either 2 or 4. Where the medium is an aliphatic alcohol, $n=0$ and the platinum carboxylate is substantially free of platinum-bonded hydroxyl groups.

Among the organic radicals which R in Formulae (1) and (2) may represent are, e.g., monovalent hydrocarbon radicals free of aliphatic unsaturation, halogenated monovalent hydrocarbon radicals free of aliphatic unsaturation, cyanoalkyl radicals, etc. More particularly, radicals represented by R include alkyl radicals (e.g., methyl, ethyl, propyl, isopropyl, butyl, octyl, etc. radicals); cycloalkyl radicals (e.g., cyclopentyl, cyclohexyl, cycloheptyl, etc. radicals); aryl radicals (e.g., phenyl, naphthyl, tolyl, xylyl, etc, radicals); aralkyl radicals (e.g. benzyl, phenylethyl, phenylpropyl, etc. radicals; halogenated derivatives of the above radicals, including chloromethyl, chloropropyl, trifluoromethyl, chlorophenyl, dibromophenyl, tetrachlorophenyl, difluorophenyl, etc. radicals; and cyanoalkyl radicals, e.g., betal-cyanoethyl, gamma-cyanopropyl, beta-cyanopropyl, etc. radicals. Preferably, at least 25 percent and as much as 50 percent of the R groups attached to silicon in the polysiloxanes of Formula (1) and Formula (2) are methyl radicals, R' is a monovalent radical containing one or more olefinic or acetylenic bonds, e.g., vinyl, ethenyl, allyl, methallyl, butenyl, 1,3-butadienyl, ethynyl, cyclohexenyl, cycloheptenyl, and is preferably an alkenyl radical.

The hydrogen polysiloxanes which are employed in the practice of the present invention can also be characterized as copolymers containing at least one unit per molecule having the formula:

(6)     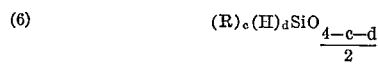

with the remaining siloxane units in the organopolysiloxane having the average formula:

(7)     

where R is as previously defined, $c$ is a whole number from 0 to 2, inclusive, $d$ is a whole number from 1 to 2, inclusive, and the sum of $c$ plus $d$ is equal to from 1.0 to 3.0, inclusive, and $m$ has a value of from 1.0 to 3.0, inclusive. Within the scope of Formula (6) are siloxane units, such as hydrogen siloxane HSiO$_{1.5}$, methyl hydrogen siloxane units (CH$_3$)(H)SiO, dimethyl hydrogen siloxane units (CH$_3$)$_2$(H)SiO$_{0.5}$, and dihydrogen siloxane units (H$_2$SiO). The copolymers containing the siloxane units of Formula (6) and the siloxane units of Formula (7) are present in proportions so as to form a hydrogen poly-siloxane within the scope of Formula (2). In general, the copolymers contain from 0.05 to 99.5 mole percent of the siloxane units of Formula (6) with from 0.5 to 99.95 mole percent siloxane units of Formula (7).

The hydrogen polysiloxanes are well known in the art and include such materials as 1,3-dimethyldisiloxane, 1,1,3-trimethyldisiloxane, 1,1,3,3-tetramethyldisiloxane, as well as higher polymers containing up to 100,000 or more silicon atoms per molecule. Also included within the scope of Formula (2) are cyclic materials, such as the cyclic polymers of methyl hydrogen siloxane having the formula (CH$_3$SiHO)$_x$ where $x$ is a whole number equal to from 3 to 10 or more.

The alkenyl polysiloxanes of Formula (1) which are employed in the practice of the present invention are also well known in the art and can also be characterized as copolymers of (1) siloxane units having the formula (8)     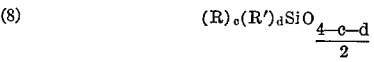

where R, R', $c$, $d$ and the sum of $c$ plus $d$ are as previously defined, with (2) an organopolysiloxane within the scope of Formula (7). Where the alkenyl polysiloxane is a copolymer containing at least one unit per molecule having a formula within the scope of Formula (8) with an organopolysiloxane having an average formula within the scope of Formula (7), the copolymer generally contains from 0.05 to 99.5 mole percent of the units of Formula (8), and from 0.5 to 99.95 mole percent of units within the scope of Formula (7).

The preparation of the unsaturated organopolysiloxanes within the scope of Formula (1) is well known in the art. Included within the scope of the siloxanes of Formula (1) are low molecular weight materials such as vinylpentamethyldisiloxane, 1,3-divinyltetramethyldisiloxane, 1,1,3-trivinyltrimethyldisiloxane, 1,1,3,3-tetravinyldimethyldisiloxane, as well as higher polymers containing up to 100,000 or more silicon atoms per molecule. Also included among the alkenyl polysiloxanes within the scope of Formula (1) are cyclic materials containing silicon-bonded vinyl or allyl radicals, such as the cyclic trimer, tetramer or pentamer of methylvinyl siloxane

[CH$_2$=CH)(CH$_3$)SiO]

or methyl allylsiloxane

[CH$_2$=CH—CH$_2$)(CH$_3$)SiO]

The halocarbon inhibitors employed in the practice of the present invention may be used as admixtures with the platinum compound catalyst in combination with the alkenyl polysiloxane and the hydrogen polysiloxane, or added to a platinum compound catalyzed reaction product of the alkenyl polysiloxane and the hydrogen polysiloxane prior to completion of the reaction to stabilize the partial reaction product, or the halocarbon inhibitors may be used to dissolve the platinum compound catalyst prior to adding the catalyst to the mixture of polysiloxanes.

In carrying out the process of the present invention, preferably the platinum compound catalyst and the halocarbon inhibitor are mixed together and this mixture is added to the mixture of the alkenyl polysiloxane and the hydrogen organopolysiloxane in the desired proportions. In this condition, the mixture of ingredients can be maintained at temperatures of from about 20–30° C. for as long as thirty days.

The proportions of alkenyl polysiloxane and hydrogen polysiloxane can vary within extremely wide limits since many of the products prepared by the process of this invention exhibit satisfactory properties for intended purposes even when the final product contains unreacted silicon-bonded alkenyl radicals or contains unreacted silicon-hydrogen linkages. However, it is generally preferred that the alkenyl polysiloxane and the hydrogen polysiloxane be present in such proportions that the reaction mixture contains from about 0.05 to 20 silicon-hydrogen linkages per silicon-bonded alkenyl radical. Also, it is desirable to have an equal number of silicon-hydrogen linkages and alkenyl radicals in the reaction mixture so as to produce a final product which is substantially free of either silicon-hydrogen linkages or silicon-bonded alkenyl radicals.

The amount of the halocarbon inhibitor used can be varied depending on such characteristics as the type and amount of platinum compound catalyst used, the degree of inhibition desired to be imparated to the platinum compound catalyst and very often the type of alkenyl polysiloxane and hydrogen polysiloxane employed. Generally, it is desirable that the halocarbon be employed in an amount from 6% to 85% by weight of the total mixture.

The platinum compound catalyst is generally added to the reaction mixture in an amount related to the amount of alkenyl (e.g., vinyl or allyl) radicals in the alkenyl polysiloxane to be reacted.

Satisfactory reaction can occur when the platinum compound catalyst is present in amounts sufficient to provide as little as one molecule of platinum compound per million silicon-bonded alkenyl groups in the alkenyl polysiloxane. In general, it is preferred to employ the lowest platinum compound to silicone ratios that can give an adequate cure rate. Such a ratio would include one platinum compound molecule per one thousand to one million silicon-bonded alkenyl groups in the alkenyl polysiloxane to be reacted.

The characteristics of the products prepared in accordance with the process of the present invention can vary greatly with the nature of the starting maerials. For example, when a reaction mixture comprises vinyl pentamethyldisiloxane and pentamethyldisiloxane, the reaction product consists of two pentamethyldisiloxane groups joined by a silethylene group. In the case of a reaction mixture which contains a compound such as 1,1,3,3-tetramethyldisiloxane and a higher molecular weight organopolysiloxane containing more than two silicon-bonded vinyl or allyl groups per molecule, the resulting product is a crosslinked silicone.

The time required for effecting the addition reaction can also vary within wide limits, depending upon the particular reactants involved, the proportion of the reactants, the type and amount of platinum compound catalyst, the reaction temperature and the type and amount of halocarbon inhibitor. By proper selection of the platinum compound catalyst, halocarbon inhibitor, and reactants, the reaction can be effected in times which may vary from a few minutes up to 24 hours or more. If all other factors are equal, the rate of reaction increases as the temperature and the concentration of the platinum compound catalyst increases and as the concentration of the halocarbon inhibitor decreases.

In order that those skilled in the art may better understand how the present invention can be practiced, the following examples are given by way of illustration and not by way of limitation. All parts and percentages are by weight.

EXAMPLE 1

A catalyst within the scope of the present invention was prepared by dissolving chloroplatinic acid in 2-ethylhexyl alcohol in the ratio of 1 mole of chloroplatinic acid hexahydrate and 7 moles of 2-ethylhexyl alcohol. The pressure on the resulting reaction mixture was reduced to 25 millimeters and the reaction mixture was heated for 40 hours at 70° C., during which time hydrogen chloride and water were removed from the system. The pressure was then further reduced to 2 millimeters and the heating was continued until all unreacted alcohol had been removed. The reaction mixture was then allowed to cool at room temperature and was filtered. The filtrate was a viscous, pale brown liquid and comprised the catalyst of the present invention. This catalyst contained 21 percent by weight platinum and 8.3 percent by weight chlorine, which corresponds to about 2.1 atoms of chlorine per atom of platinum. The catalyst is dissolved in benzene to produce a solution containing 2000 p.p.m. of platinum.

The alkenyl polysiloxane employed in this example has the average structure:

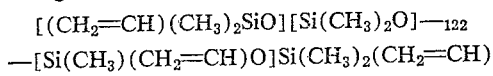

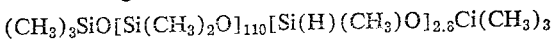

The compound has a viscosity of 130 centistokes at 25° C. and contains about 0.4 mole of vinyl units per kilogram of fluid.

The hydrogen polysiloxane employed in this example has the average structure:

$$(CH_3)_3SiO[Si(CH_3)_2O]_{110}[Si(H)(CH_3)O]_{2.8}Ci(CH_3)_3$$

The above compound has a viscosity of about 110 centistokes at 25° C. and contains about 0.4 mole of SiH per kilogram of fluid.

Thte alkenyl polysiloxane and hydrogen polysiloxane employed in this example were present as a blend in a weight ratio of nine parts of the vinyl polysiloxane to eleven parts of the hydrogen polysiloxane. This results in an approximate ratio of 9 moles of vinyl groups for every eleven moles of (≡SiH) groups.

To each of a series of individual portions of the benzene solution of the platinum compound catalyst was added a different halocarbon inhibitor. Each solution formed was added to a separate mixture of hydrogen polysiloxane and alkenyl polysiloxane. A blank was also prepared containing the reaction mixture, but no halocarbon inhibitor, for comparison purposes. The mixtures containing the various halocarbon inhibitors were then tested by allowing them to stand at room temperature in sealed containers. The mixtures were observed for 1800 hours and note was taken of the length of time it took for the less effectively inhibited mixtures to gel; this gel point at which the co-reaction product was a soft, resilient, rubber-like product was taken as a reference point for time stability. After 1800 hours for the effectively inhibited mixtures, halocarbon inhibitor was volatilized and the various reaction products of the vinylpolysiloxane and the hydrogen polysiloxane were subjected to oven temperature of 100° C. to study their cure properties. The following Table 1 shows the type of halocarbon inhibitor, the weight of silicone blend used, the halocarbon inhibitor weight, the weight of the 2000 p.p.m. catalyst solution, and the gel time at room temperature of the less effectively inhibited reaction mixture, and the results of the oven cure test. The materials which were heated in the oven were examined after 24 hours of heating and found to be cured.

TABLE I

| Inhibitor | Wt. of Silicone Blend (gms.) | Wt. of Inhibitor (gms.) | Catalyst Weight (gms.) | Gel Time at Rm. Temp. (hrs.) | Oven Cure (100° C.) of Aged Inhibited Systems |
|---|---|---|---|---|---|
| $Cl_2C=CClH$ | 2.00 | 8.2 | 0.04 | ---------- | Cured. |
| $FCl_2C-CCl_2F$ | 2.00 | 8.4 | 0.04 | 230-250 | |
| $CCl_2=CCl_2$ | 2.00 | 8.4 | 0.04 | ---------- | Do. |
| $HClC=CClH$ | 2.00 | 8.5 | 0.04 | <65 | |
| None | 2.20 | ---------- | 0.04 | <65 | |

EXAMPLE 2

The platinum compound catalyst used in this example was the same as that used in Example 1. The silicone used in this example was an 11.2% by weight solution of silicone blend in benzene. The silicone blend contained 86.8% of a vinylpolysiloxane having the average formula:

$(CH_2=CH)(CH_3)_2SiO[Si(CH_3)_2O]_{860}$
$[Si(CH_3)(CH=CH_2)O]_{10}Si(CH_3)_2(CH_2=CH)$ the remainder of the silicone blend was a hydrogen polysiloxane have the average formula:

$(CH_3)_3SiO[Si(CH_3)_2O]_{110}[Si(CH_3)(H)O]_{2.8}OSi(CH_3)_3$

To a series of benzene solutions of the platinum alcoholate catalyst were added varying amounts of perchloroethylene inhibitor, except for a blank. Each of the solutions formed was added to a separate silicone blend in benzene. The various mixtures formed were then tested by measuring the viscosity increase at various time intervals and measuring the gel time, all at room temperature. The mixtures were kept in sealed containers except when samples were removed. The results are shown in Table II.

TABLE II

| Wt. of Benzene Solution of Silicone Blend (grams) | Wt. of Perchloroethylene (grams) | Catalyst Solution Weight (grams) (2,000 p.p.m. Pt) | Time in Hours | Viscosity, centistokes |
|---|---|---|---|---|
| 20 | 0 | 0.06 | 15 | Gelled |
| 10 | 0.3 | 0.02 | 65 | Gelled |
| 10 | 0.6 | 0.02 | 100 | 305 |
|  |  |  | 200 | 520 |
|  |  |  | 250 | 625 |
|  |  |  | 370 | Gelled |
| 10 | 1.0 | 0.02 | 100 | 90 |
|  |  |  | 200 | 111 |
|  |  |  | 300 | 133 |
|  |  |  | 400 | 154 |
|  |  |  | 500 | 176 |
|  |  |  | 600 | 197 |
|  |  |  | 700 | 210 |
| 10 | 3.0 | 0.02 | 100 | 41 |
|  |  |  | 200 | 47 |
|  |  |  | 300 | 52 |
|  |  |  | 400 | 50 |
|  |  |  | 500 | 63 |
|  |  |  | 800 | 68 |
|  |  |  | 700 | 74 |

EXAMPLE 3

A silicone blend was prepared which contained 7.1 grams of the hydrogen polysiloxane described in Example 1 and having the formula:

$(CH_3)_3SiO[Si(CH_3)_2O]_{110}[Si(CH_3)(H)O]_{2.8}Si(CH_3)_3$ and 10.0 grams of a vinyl polysiloxane having the average formula:

$[(CH_2=CH)(CH_3)_2SiO_{1/2}]_{3.1}$
$[Si(CH_3)_2O]_{215}[Si(CH_3)O_{3/2}]_{1.1}$

The vinyl polysiloxane has a viscosity of 684 centistokes and contains about 0.26 mole of vinyl per kilogram of fluid. To each individual 0.14 gram portion of the benzene solution of platinum alcoholate catalyst (2000 p.p.m. platinum) was added 2 ml. of a different halocarbon inhibitor and each solution formed was added to two grams of the hydrogen polysiloxane, vinyl polysiloxane mixture. The mixtures were allowed to stand at room temperature in a closed container until the liquid polysiloxane was converted to a non-flowing gel; this gel point at which the coreaction product was a soft, resilient, rubber-like product was taken as the reference point for time stability. The results are tabulated below.

TABLE III

| Inhibitor | Wt. of Silicone Blend (grams) | Weight of Inhibitor (grams) | Weight of Catalyst Solution (2,000 p.p.m. Pt) | Gel Time at Room Temperature (hours) |
|---|---|---|---|---|
| None | 2 | 0 | 0.14 | 2 |
| Perchloroethylene | 2 | 3.25 | 0.14 | 47 |
| Trichloroethylene | 2 | 2.9 | 0.14 | >71 |

EXAMPLE 4

A mixture was prepared from 14 grams of vinyl polysiloxane having the average formula:

$(CH_3)_3SiO[Si(CH_3)_2O]_{245}$
$[SiCH_3(CH=CH_2)O]_{2.0}Si(CH_3)_3$ 5 grams of the hydrogen polysiloxane having the average formula:

$(CH_3)_3SiO[Si(CH_3)_2O]_{110}[Si(H)(CH_3)O]_{2.8}Si(CH_3)_3$ and 267.5 grams of perchloroethylene.

There was added to 23 grams of the above polysiloxane mixture 0.05 ml. of platinum alcoholate catalyst solution (described in Example 1) containing 0.001 gram of platinum. The solution remained stable in a closed container for one month at room temperature before gelation occurred.

A second fraction of a fresh mixture catalyzed as above was allowed to stand in an open dish for 24 hours. A partial cure occurred within the 24 hour period and the composition cured to a rubbery material within 72 hours at room temperature.

Perchloroethylene was evaporated from a third fresh sample of the polysiloxane mixture catalyzed as above. The mixture cured to a rubbery material on heating at 90° C. for 15 minutes.

A fourth fresh sample of the polysiloxane mixture, catalyzed as above, was used to saturate a sample of white cotton cloth. The cloth was blotted free of excess solution with absorbent paper and heated to cure for ½ hour at 100° C. The resulting cloth was water repellant.

While the foregoing examples are only illustrative of the present invention, it is intended that other platinum compound catalysts and other halocarbon inhibitors, many examples of which have been given above, can be used in a wide range of proportions within the scope of the invention.

In addition to the vinyl polysiloxane and hydrogen polysiloxane employed in the foregoing examples, other alkenyl polysiloxanes and hydrogen polysiloxanes can be employed, many of which have been referred to above. Among the alkenyl polysiloxanes which can be used with success is, for example, the trimethyl siloxy chain-stopped methyl vinyl polysiloxane fluid, which can be prepared by conventional procedures from hexamethyldisiloxane, octamethylcyclotetrasiloxane, and tetramethyl tetravinylcyclotetrasiloxane. This fluid, when prepared from the requisite proportions of ingredients, contains about 0.3 mole percent methyl vinylsiloxane units and has a viscosity of about 500 centipoises at 25° C. This vinyl polysiloxane can then be coreacted with a methyl hydrogen polysiloxane fluid which can be prepared, for instance, by the cohydrolysis of methyl dichlorosilane, trimethylchlorosilane, and dimethyldichlorosilane in amounts sufficient to provide 2.5 mole percent of the methyl hydrogensiloxane unit, which when prepared in the usual fashion, will be found to have a viscosity of 150 centipoises at 25° C.

A still further vinylpolysiloxane which can be used is a methylphenylvinylpolysiloxane prepared from hexamethyldisiloxane, octamethylcyclotetrasiloxane, tetramericmethylphenylcyclopolysiloxane, and the tetrameric methylvinylcyclopolysiloxane. By proper selection of the coreactants in making this methylphenylvinylpolysiloxane, one can obtain a fluid having a viscosity of about 1500 centipoises at 25° C. and containing 0.5 mole percent methyl vinylsiloxane units and 27.8 mole percent methylphenylsiloxane units.

A still further hydrogen polysiloxane which can be employed in combination with the alkenylpolysiloxane is one prepared by cohydrolyzing $CH_3SiHCl_2$, $$(CH_3)(C_6H_5)SiCl_2$$

$(CH_3)_3SiCl$, and $(CH_3)_2SiCl_2$, which by proper choice of the ingredients, will yield a fluid of about 300 centipoise viscosity at 25° C. and will contain 5 mole percent $CH_3SiHO$ units and 24 mole percent $(CH_3)(C_6H_5)SiO$ units.

The products prepared by the addition of the coreactants described in the instant application have utility in various fields. Thus, the products formed from reacting the alkenylpolysiloxane with the hydrogen polysiloxane can be used in conventional silicone polymer applications. For example, it is possible to prepare these coreaction products in any shape desired, either in the unsupported or supported state. Those materials which ordinarily are rubbery polymers can be used as gaskets and the like similar to the manner in which conventional silicone rubbers are employed. Those materials which are resinous in character can be used as insulation for electrical conductors and after effecting the coreaction at the elevated temperatures between the alkenylpolysiloxane and hydrogen polysiloxane, the electrical conductors can be used for conventional applications. The coreacted composition can also be used as potting gels for various types of electrical equipment, e.g., in making capacitors and the like. The halocarbon inhibited solution of reactive polysiloxanes may be applied to a material, the halocarbon may then be removed and the polysiloxanes cured in or on the material. If the halocarbon is a Freon, the halocarbon may be used in a three-fold capacity, that of inhibitor, solvent and propellant in the application of the reactive polysiloxane composition.

What I claim as new and desire to secure by Letters Patent of the United States is:

1. The process for reducing the activity of a platinum compound catalyst employed to effect copolymerization of a mixture of copolymerizable ingredients comprising (a) an alkenylpolysiloxane containing at least two alkenyl groups per molecule and having the average formula:

$$R_aR'_bSiO_{\frac{(4-a-b)}{2}}$$

and (b) a hydrogen polysiloxane containing at least two ≡SiH groups per molecule and having the average formula:

$$R_aH_bSiO_{\frac{(4-a-b)}{2}}$$

where R is an organic radical attached to silicon by a C—Si linkage and is selected from the class consisting of monovalent hydrocarbon radicals free of aliphatic unsaturation, halogenated monovalent hydrocarbon radicals free of aliphatic unsaturation and cyanoalkyl radicals, R' is an organic radical attached to silicon by a C—Si linkage and contains aliphatic carbons linked by multiple bonds, $a$ has a value of from 0 to 2, inclusive, $b$ has a value of from 0.0005 to 2.0, inclusive, and the sum of $a$ plus $b$ is equal to from 1.0 to 3, inclusive, which process comprises incorporating in the mixture of ingredients in an amount of from 6% to 85% by weight of the total mixture, a halocarbon which acts as a catalyst inhibitor, selected from the class consisting of halocarbons having two carbon atoms and at least three halogen atoms per molecule having an atomic weight of less than 126.

2. The process as in claim 1 in which the halocarbon is selected from the group consisting of trichloroethylene and 1,2-difluoro-1,1,2,2-tetrachloroethane.

3. The process as in claim 1 in which the halocarbon is perchloroethylene.

4. A composition of matter comprising (a) an alkenylpolysiloxane containing at least two alkenyl groups per molecule and having the average formula:

$$R_aR'_bSiO_{\frac{(4-a-b)}{2}}$$

(b) a hydrogen polysiloxane containing at least two ≡SiH groups per molecule and having the average formula:

$$R_aH_bSiO_{\frac{(4-a-b)}{2}}$$

where R is an organic radical attached to silicon by a C—Si linkage and is selected from the class consisting of monovalent hydrocarbon radicals free of aliphatic unsaturation, halogenated monovalent hydrocarbon radicals free of aliphatic unsaturation, and cyanoalkyl radicals, R' is an organic radical attached to silicon by a C—Si linkage and contains aliphatic carbons linked by multiple bonds, $a$ has a value from 0 to 2, inclusive, $b$ has a value from 0.0005 to 2.0, inclusive, and the sum of $a$ plus $b$ is equal to from 1.0 to 3, inclusive, (c) a platinum compound catalyst effective in causing copolymerization of (a) and (b), and (d) a halocarbon effective as a catalyst inhibitor selected from the class consisting of halocarbons having two carbon atoms per molecule and at least three halogen atoms per molecule having an atomic weight of less than 126.

5. A composition of matter as in claim 4 in which the halocarbon is selected from the group consisting of trichloroethylene and 1,2 - difluoro - 1,1,2,2 - tetrachloroethane.

6. A composition as in claim 4 in which the halocarbon is perchloroethylene.

7. The process of making and using a storable, curable potentially reactive polysiloxane mixture stabilized with a volatile halocarbon inhibitor which comprises forming a composition containing a volatile halocarbon inhibitor having two carbon atoms and at least three halogen atoms, a platinum compound catalyst system, a hydrogen polysiloxane and an alkenylpolysiloxane, storing the inhibited composition until the time of use, then volatilizing the inhibitor and curing the reactive mixture of vinyl polysiloxane and hydrogen polysiloxane in the presence of the platinum compound catalyst.

8. The process as described in claim 7 where the inhibitor is perchloroethylene.

References Cited
UNITED STATES PATENTS

| | | | |
|---|---|---|---|
| 3,188,299 | 6/1965 | Chalk | 260—46.5 |
| 3,188,300 | 6/1965 | Chalk | 260—46.5 |
| 3,344,111 | 9/1967 | Chalk | 260—46.5 |

DONALD E. CZAJA, *Primary Examiner.*

M. I. MARQUIS, *Assistant Examiner.*